Patented Dec. 3, 1929

1,737,763

UNITED STATES PATENT OFFICE

IRVIN W. HUMPHREY, OF DOVER, NEW JERSEY, AND LEAVITT N. BENT, OF HOLLY-OAK, DELAWARE, ASSIGNORS TO HERCULES POWDER COMPANY, OF WILMINGTON, DELAWARE, A CORPORATION OF DELAWARE

PROCESS OF REFINING WOOD ROSIN

No Drawing. Application filed May 15, 1923. Serial No. 639,205.

The object of our invention is to so treat wood rosin as to produce a rosin so highly refined that it is adapted for use in manufacturing high grade rosin soaps.

A known process of producing wood rosin of a lower grade consists in grinding wood and stumps from pine trees, placing the wood stock in large digesters, passing steam through the stock and thus driving off a considerable quantity of turpentine, flooding the stock with gasoline or other solvent, thereby extracting certain materials, chiefly rosin, pine oil and various color bodies, passing the gasoline solution, commonly known as "drop liquor" through suitable evaporators, and fractionally removing the gasoline and pine oil. The pine oil produced by the distillation is refined and sold. The recovered gasoline is again used in the process.

The recovered rosin is a marketable product but is satisfactory only for such uses as sizing inferior grades of paper and use in inferior grades of varnish. It is possible, however, by a subsequent refining (distilling) operation, not involving the employment of our invention, to so far refine this rosin as to adapt it for use in sizing high grades of paper and making the best varnish, but such refined rosin, although of high grade, will not produce soaps or limed varnishes of satisfactory color. This discoloration of the soaps is undoubtedly due to some volatile color bodies that are carried over in the distillation of the rosin. These color bodies are not visibly present in the rosin itself, but when the rosin comes into contact with the alkali used in making soap, or with the lime used in the manufacture of certain varnishes, or in the mere heating of rosin, while in contact with air, in the manufacture of varnish generally, a marked coloration develops. To overcome this difficulty we subject the "drop liquor", referred to in the above description of a known process for extracting rosin from wood, to a special treatment before separating out the rosin from the solvent and pine oil. This drop liquor may be considered as a fifteen to twenty per cent solution of rosin in solvent consisting mostly of gasoline. Pine oil and some turpentine are also present in the solvent.

The drop liquor is washed with an aqueous solution of alkali, preferably ammonium hydroxid or sodium hydroxid ($NH_4OH$ or $NaOH$). The exact strength of the solution is apparently not important. As an example, a two-tenths of one per cent strength alkali solution of $NH_4OH$ or $NaOH$ in weight equal to the weight of the drop liquor is generally found efficacious. To obtain a greater purifying action, a larger quantity of alkali can be used. It is sometimes advisable to use an alkali concentration as high as 0.8%. An even higher limit, perhaps 2%, might sometimes be of advantage. This treatment will remove from five to fifteen per cent of the rosin from the drop liquor by reason of its neutralization by the alkali. It may be advantageous to add a small amount of sodium chloride, or other electrolyte, in order to hasten the breaking of the emulsion. A certain quantity of the ammonium or sodium salts of rosin acids are formed. A portion of the color bodies which exert a harmful effect in the manufacture of soaps is carried down in the alkali washing medium. These color bodies in the alkali solution belong, it is believed, to the indefinite class of substances known as humic acids.

After thorough agitation, the mixture is allowed to stand and the aqueous washing medium separates and is easily removed. The treated drop liquor is then washed with water and is then given the regular distillation treatment for drop liquor, whereby the gasoline and pine oil are separated from the rosin.

Although this rosin is of substantially higher quality than would be produced if the alkali refining process were omitted, it is desirable, if not necessary, to further refine the rosin. While the additional refining process is not our invention per se, its use in connection with our alkali refining process is new with us, and inasmuch as its employment may be necessary in order to secure the ultimate product desired, it will be briefly described; reference being made to another application filed by Kaiser and Langmeier May 15, 1923, Serial No. 639,054, for a more specific disclosure.

The rosin is (preferably) first heated under a high vacuum to a temperature of about 480° F. and preliminarily distilled. It is then heated to a higher temperature. With a vacuum of 28 inches, the permissible temperature range would be from 500-700° F., preferably 600°-650° F. It is obvious, however, that the permissible temperature range would vary with the degree of vacuum and that with a substantially higher degree of vacuum than that specified, the minimum permissible and preferred temperatures would be below those specified. Hot oil circulating through a coil in a vacuum still into which the preheated and preliminarily distilled rosin is conveyed, or hot oil circulating through a jacket on the still, is a convenient and effective heating medium. It is advisable to inject superheated steam into the rosin to aid in carrying out the distillation. The rosin is then subjected to fractional condensation. It may be passed through three condensers maintained at temperatures respectively of 400° F., 350° F. and 300° F. Any uncondensed rosin mist or vapor may be conveyed to an endless circuit of gasoline, kerosene or other solvent and thereby dissolved. The solvent may be carried in water-cooled pipes and the water of condensation settled out in a separating tank.

The rosin condensed in the two condensers subjected to the highest temperatures is substantially free of those color bodies which, if it were not for our alkali refining process, would be present and which, if present, would unfit the rosin for use in the manufacture of rosin soaps or limed rosin varnishes of satisfactory color.

Ammonium hydroxid is preferred as a treating agent for the drop liquor in the alkali refining step of our process. But any other alkali, as NaOH, or $Na_2CO_3$, may be used. The rosin dissolved in the alkali solution may be recovered by acidification. When ammonia is employed, by heating the ammoniacal solution of rosin and coloring matter, there is a differential separation of rosin and coloring matter as the ammonia is driven off. The rosin of highest quality in the wash liquor is precipitated first and can be separated and is a salable product. The rosin that is precipitated toward the last is very dark and contains a large percentage of coloring matter. While the uses of the last fraction that precipitates are very limited, it is but a small fraction of the total amount of rosin in the drop liquor, and if it were discarded as worthless, its loss would be far more than compensated for by the substantial increase in quality and value of the large proportion of rosin that is ultimately recovered as a high grade rosin adapted for the manufacture of rosin soap as well as for other uses, such as sizing high grade paper and in the manufacture of varnish.

While in the claims we have referred to the process as one adapted to the manufacture of rosin soaps, it is intended to cover all uses for which the rosin may be adapted, as, for example, the making of limed varnishes, as hereinbefore specified, or the sizing of high grade papers.

Having now fully described our invention, what we claim and desire to protect by Letters Patent is:—

1. The process of producing rosin adapted to the manufacture of products of good color as herein specified, which comprises treating with a dilute alkali solution the drop liquor obtained in the extraction of rosin from wood by means of a low boiling petroleum distillate, separating from the drop liquor the alkali together with the color bodies carried down thereby, distilling the drop liquor to separate out most of the low boiling petroleum distillate from the rosin, distilling the rosin under a vacuum, and then condensing the rosin at a temperature within about the range 300° F.–400° F.

2. In the manufacture of rosin adapted to the manufacture of products of good color as herein specified, the process which comprises treating the drop liquor obtained in the extraction of rosin from wood by means of a low boiling petroleum distillate with an alkali in quantity insufficient to effect saponification of over about 15% of the rosin, separating from the drop liquor the alkali together with the color bodies carried down thereby, distilling the drop liquor to separate out most of the low boiling petroleum distillate from the rosin, distilling the rosin under a vacuum and condensing a fraction of the vaporized rosin at a temperature within about the range 300° F.–400° F.

3. The process of producing rosin adapted to the manufacture of products of good color as herein specified, which comprises treating the drop liquor obtained in the extraction of rosin from wood by means of a low boiling petroleum distillate with an alkali in amount not substantially in excess of about 2%, separating from the drop liquor the alkali together with the color bodies carried down thereby, distilling the drop liquor to separate out most of the low boiling petroleum distillate from the rosin, distilling the rosin under a vacuum, and condensing a fraction of the vaporized rosin at a temperature within about the range 300° F.–400° F.

4. In the manufacture of rosin adapted to the manufacture of products of good color as herein specified, the process which comprises treating with a solution of ammonium hydroxid the drop liquor obtained in the extraction of rosin from wood by means of a low boiling petroleum distillate, separating from the drop liquor the ammoniacal solution together with the color bodies and some rosin that are carried down thereby, distilling the drop liquor to separate most of the low boiling petroleum distillate from the rosin, heating the ammoniacal solution of rosin and coloring matter, thereby differentially separating the rosin and coloring matter as the ammonia is driven off, and separating out precipitated rosin.

5. In the manufacture of rosin adapted to the manufacture of products of good color as herein specified, the process which comprises treating drop liquor obtained in the extraction of rosin from wood by means of a low boiling petroleum distillate with an alkali in sufficient quantity to saponify from about 5%–15% of the rosin, agitating the mixture, allowing the mixture to settle, withdrawing the alkali together with the color bodies carried down thereby, washing the drop liquor with water, and fractionally distilling off the low boiling petroleum distillate.

In testimony of which invention, I, IRVIN W. HUMPHREY, have hereunto set my hand at Kenvil, N. J., on this 11th day of April, 1923, and I, LEAVITT N. BENT, have hereunto set my hand at Wilmington, Del., on this 25th day of April, 1923.

IRVIN W. HUMPHREY.
LEAVITT N. BENT.